United States Patent
Fang et al.

(10) Patent No.: US 9,664,917 B2
(45) Date of Patent: May 30, 2017

(54) LIQUID CRYSTAL DISPLAY PANEL AND LIQUID CRYSTAL DISPLAY DEVICE

(71) Applicant: Shenzhen China Star Optoelectronics Technology Co., Ltd., Shenzhen, Guangdong (CN)

(72) Inventors: Bin Fang, Shenzhen (CN); Chihming Yang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 45 days.

(21) Appl. No.: 14/360,659

(22) PCT Filed: Mar. 11, 2014

(86) PCT No.: PCT/CN2014/073195
§ 371 (c)(1),
(2) Date: May 27, 2014

(87) PCT Pub. No.: WO2015/131409
PCT Pub. Date: Sep. 11, 2015

(65) Prior Publication Data
US 2015/0261002 A1   Sep. 17, 2015

(30) Foreign Application Priority Data
Mar. 3, 2014 (CN) .......................... 2014 1 0074843

(51) Int. Cl.
*G02B 27/22* (2006.01)
*G02F 1/133* (2006.01)
(Continued)

(52) U.S. Cl.
CPC ......... *G02B 27/2264* (2013.01); *G09G 3/003* (2013.01); *G09G 3/3614* (2013.01); *H04N 13/0438* (2013.01); *G09G 2320/0257* (2013.01)

(58) Field of Classification Search
CPC ............. G02B 27/2264; G02F 1/13306; G02F 1/134336; G02F 1/1368; G02F 1/136277; G02F 1/133; G09G 3/36
See application file for complete search history.

(56) References Cited

U.S. PATENT DOCUMENTS

2006/0139281 A1* 6/2006 Park ..................... G09G 3/3614
345/96
2008/0170025 A1* 7/2008 Song .................... G09G 3/3614
345/96
(Continued)

*Primary Examiner* — Jennifer Mehmood
*Assistant Examiner* — Sardis F Azongha
(74) *Attorney, Agent, or Firm* — JMB Davis Ben-David

(57) ABSTRACT

A liquid crystal display panel and a liquid crystal display device are disclosed. The liquid crystal display panel has first pixel units and second pixel units, when the liquid crystal display panel displays odd frames, a polarity of each of the first pixel units is changed, and a polarity of each of the second pixel units is maintained. Otherwise, when the LCD panel displays even frames, a polarity of each of the second pixel units is changed, and a polarity of each of the first pixel units is maintained. Since each frame of the liquid crystal display panel only changes the polarity of the partial pixel units, image sticking and 3D ghosting phenomena can be effectively eliminated.

15 Claims, 3 Drawing Sheets

(51) Int. Cl.
*H04N 13/04* (2006.01)
*G09G 3/00* (2006.01)
*G09G 3/36* (2006.01)

(56) References Cited

U.S. PATENT DOCUMENTS

2009/0310077 A1* 12/2009 Kim .................... G09G 3/3614
                                              349/151
2011/0050753 A1*  3/2011 Li ...................... G09G 3/3614
                                              345/690

* cited by examiner

LIQUID CRYSTAL DISPLAY PANEL AND LIQUID CRYSTAL DISPLAY DEVICE

FIELD OF THE INVENTION

The present invention relates to a liquid crystal technical field, and in particular to, it relates to a liquid crystal display panel and a liquid crystal display device.

BACKGROUND OF THE INVENTION

An active shutter 3D technology for performing a 3D display can be achieved by 3D shutter glasses cooperative with a high refresh rate LCD (Liquid Crystal Display), wherein the 3D shutter glasses are substantially two pieces of liquid crystal screens which are controllably switched on/off, respectively. A liquid crystal layer of each liquid crystal screen has both black and white states. When powered on, the glasses switch to the black state. When powered off, they switch to the white, namely, transparent state. Thus, either piece of the liquid crystal screens may receive a left-eye frame signal from the LCD, and the other piece of the liquid crystal screens may receive a right-eye frame signal from the LCD. Meanwhile, the LCD emits synchronous signals via a signal transmission device to accomplish synchronization of the liquid crystal screens switching of the 3D shutter glasses with the left-eye and the right-eye frames switching of the LCD.

The liquid crystal molecules have a characteristic that if an electric field direction applied on two sides of the liquid crystal layer is kept for a long time, the characteristic of the liquid crystal molecules will be damaged and will no longer be rotated depending on the changes of the electric field, thereby expressing different grayscales. Thus, for each specific interval, the direction of the electric field must be changed to inverse the liquid crystal molecules, in order to avoid the destruction of the characteristic of the liquid crystal molecules. Due to this reason, the industry has developed a variety of driving methods to achieve the inverse of liquid crystal molecules (polarity inversion), such as dot-inversion, frame inversion, column inversion, and row inversion.

Commonly, data signals transmitted via data lines are divided by employing a common voltage (Vcom) as a reference voltage into a positive polarity (+) data signal which has a higher voltage than the common voltage, and a negative polarity (−) data signal which has a lower voltage than the common voltage. The positive polarity data signal denotes that its voltage is higher than the common voltage while the negative data signal denotes that its voltage is lower than the common voltage. In theory, when the same grayscale value is expressed by the positive and the negative polarity data signals, respectively, the display effects are consistent.

When the active shutter 3D LCD adopts the dot inversion driving method to drive the image pixel, the pixel polarity of the LCD is as shown in FIG. 1, where the frames 01 to 04 are four consecutive frames. In a common LCD, since the odd frames are configured to display the left-eye image (or right-eye image), the even frames are configured to display the right-eye image (or left-eye image). That is, if the image signal of the LCD treated as a left-eye image signal is a high grayscale signal (such as white signal) and treated as a right-eye image signal is a low grayscale signal (such as black signal), then it will appear that a positive polarity pixel (as a pixel displaying a positive polarity data signal) at the upper-left side of the frame 01 shown in FIG. 1 is configured to display the high grayscale signal, a negative polarity pixel (as a pixel displaying a negative polarity data signal) at the upper-left side of the frame 02 is configured to display the low grayscale signal, and a positive polarity pixel at the upper-left side of the frame 03 is again configured to display the high grayscale signal. while the low grayscale signal appears, either positive or negative polarity data signals will be close to the common voltage, and while in the high grayscale signal, either positive or negative polarity data signals will be far from the common voltage. This results in the LCD pixel being kept actually in either a positive polarity (displays a positive polarity data signal) or a negative polarity (displays a negative data signal), readily making an image sticking phenomenon occurring in the LCD.

When the active shutter 3D LCD adopts the two dot inversion driving method to drive the image pixel, the pixel polarity of the LCD is as shown in FIG. 2, where the frames 01 to 04 are four consecutive frames. If the image signal of the LCD appears with a left-eye image signal which is a high grayscale signal, and a right-eye image signal which is a low grayscale signal, then the positive polarity pixel at the upper-left side of the frame 01 shown in FIG. 2 will be configured to display the high grayscale signal, and the positive polarity pixel at the upper left-side of the frame 02 will be configured to display the low grayscale signal, while the negative polarity pixel at the upper-left side of the frame 03 will be configured to display the high grayscale signal, and the negative polarity pixel at the upper-left side of the frame 04 will be configured to display the low grayscale signal.

Therefore, since each pixel of the LCD displays either positive polarity high grayscale signals or negative polarity high grayscale signals, the occurrence of image sticking can be prevented.

But during the display process of the LCD, the frames 02 and 04 in the FIG. 2 are usually right-eye images, and the frames 01 and 03 are usually left-eye images. Since the frames 01 and 02 have the same polarity data signals, it is necessary to reallocate the charges of the pixels when the LCD displays the data signals. Thus, the pixel brightness will be greater after the reallocation and the screen brightness of the frame 02 will be greater than that of the frame 01. Similarly, the screen brightness of the frame 04 will be greater than that of the frame 03. That is, the brightness of the right-eye image is greater than that of the left-eye image. This will easily generate 3D ghosting, and affect the display quality of the LCD.

Therefore, it is necessary to provide an LCD panel and an LCD device to solve the existing problems.

SUMMARY OF THE INVENTION

An objective of the present invention is to provide an LCD panel and an LCD device without easy occurrence of image sticking and 3D ghosting, in order to solve the technical problems which easily occurs with image sticking and 3D ghosting in the conventional LCD panel.

To solve the above problems, the present invention provides a technical solution as follows: The present invention provides an LCD panel comprising a plurality of data lines in parallel with each other, and a plurality of scan lines in parallel with each other. The plurality of data lines and scan lines are intersected perpendicularly with each other to form a plurality of pixel units, wherein the plurality of the pixel units comprise a plurality of first pixel units configured to receive first data signals, and a plurality of second pixel units configured to receive second data signals; wherein when the LCD panel displays odd frames, a polarity of each of the first pixel units is changed, and a polarity of each of the second pixel units is maintained; while when the LCD panel displays even frames, a polarity of each of the second pixel units is changed, and a polarity of each of the first pixel units is maintained.

Within the LCD panel of the present invention, the first pixel unit and the second pixel unit are interleaved in arrangement thereof.

Within the LCD panel of the present invention, the amount of the first pixel units is equal to the amount of the second pixel units.

Within the LCD panel of the present invention, each of the pixel units comprises a thin film transistor and a pixel electrode. The thin film transistor includes a gate, a source, and a drain. The gate is connected to the corresponding scan line, the source is connected to the corresponding data line, and the drain is connected to the corresponding pixel electrode.

Within the LCD panel of the present invention, the liquid crystal display panel further comprises a scan driving circuit and a data driving circuit, the scan driving circuit is connected to the scan lines, and the data line driving circuit is connected to the data lines.

The present invention also provides an LCD device comprising a backlight; and the LCD panel including a plurality of data lines in parallel with each other and a plurality of scan lines in parallel with each other. The plurality of data lines and scan lines are intersected perpendicularly with each other to form a plurality of pixel units, wherein the plurality of the pixel units comprise a plurality of first pixel units configured to receive first data signals, and a plurality of second pixel units configured to receive second data signals; wherein when the LCD panel displays odd frames, a polarity of each of the first pixel units is changed, and a polarity of each of the second pixels unit is maintained; while when the LCD panel displays even frames, a polarity of each of the second pixel units is changed, and a polarity of each of the first pixel units is maintained.

Within the LCD device of the present invention, the amount of the first pixel units is equal to the amount of the second pixel units.

Within the LCD device of the present invention, the first pixel units and the second pixel units are interleaved in arrangement thereof.

Within the LCD device of the present invention, each of the pixel units comprises a thin film transistor and a pixel electrode. The thin film transistor includes a gate, a source, and a drain. The gate is connected to the corresponding scan line, the drain is connected to the corresponding data line, and the source is connected to the corresponding pixel electrode.

Within the liquid crystal display device of the present invention, the liquid crystal display panel further comprises a scan driving circuit and a data driving circuit. The scan driving circuit is connected to the scan lines, and the data line driving circuit is connected to the data lines.

The present invention further provides an LCD panel comprising a plurality of data lines in parallel with each other, and a plurality of scan lines in parallel with each other. The plurality of data lines and scan lines are intersected perpendicularly with each other to form a plurality of pixel units, wherein the plurality of the pixel units comprise a plurality of first pixel units configured to receive first data signals, and a plurality of second pixel units configured to receive second data signals; wherein when the LCD panel displays odd frames, a polarity of each of the second pixel units is changed, and a polarity of each of the first pixel units is maintained; while when the LCD panel displays even frames, a polarity of each of the first pixel units is changed, and a polarity of each of the second pixel units is maintained.

Within the LCD panel of the present invention, the first pixel units and the second pixel units are interleaved in arrangement thereof.

Within the LCD panel of the present invention, the amount of the first pixel units is equal to the amount of the second pixel units.

Within the LCD panel of the present invention, each of the pixel units comprises a thin film transistor and a pixel electrode. The thin film transistor includes a gate, a source, and a drain. The gate is connected to the corresponding scan line, the drain is connected to the corresponding data line, and the source is connected to the corresponding pixel electrode.

Within the LCD panel of the present invention, the LCD panel further includes a scan driving circuit and a data driving circuit. The scan driving circuit is connected to the scan lines, and the data line driving circuit is connected to the data lines.

In contrast with a conventional LCD panel and LCD device, each frame of the LCD panel and LCD device according to the present invention only changes the polarities of partial pixel units, which can effectively eliminate the image sticking and 3D ghosting phenomena of the LCD panel, thereby resolving the technical problem of the conventional LCD panel that the image sticking and 3D ghosting phenomena may easily occur.

For a better understanding of the aforementioned content of the present invention, preferable embodiments are illustrated in accordance with the attached figures as follows:

DETAILED DESCRIPTION OF THE PREFERRED EMBODIMENTS

Figure 1:
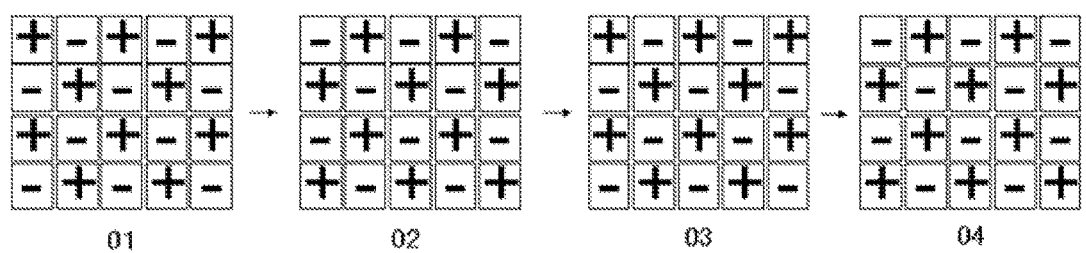
FIG. 1 is a schematic diagram of pixel polarity in a 3D shutter LCD driven by the dot-inversion method.
Figure 2:
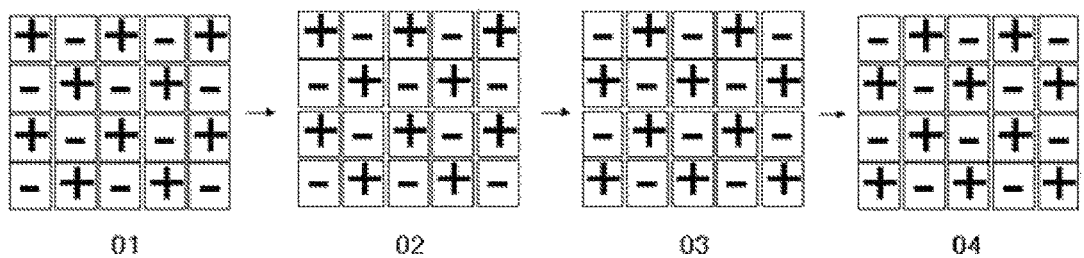
FIG. 2 is a schematic diagram of pixel polarity in a 3D shutter LCD driving by the two frame dot-inversion method.

The following descriptions of the respective embodiments are specific embodiments capable of being implemented for illustrations of the present invention, with reference to the appended figures. The terms up, down, front, rear, left, right, interior, exterior, side, etcetera are merely directions referring to the appended figures. Therefore, such directions are employed for explaining and understanding the present invention, but are not limitations thereto.

In the drawings, similar structures are represented by the same symbols.

A LCD panel according to the present invention is suited for an active shutter 3D display, which can effectively solve the technical problems of image sticking and 3D ghosting in the conventional LCD panels.

Figure 3:
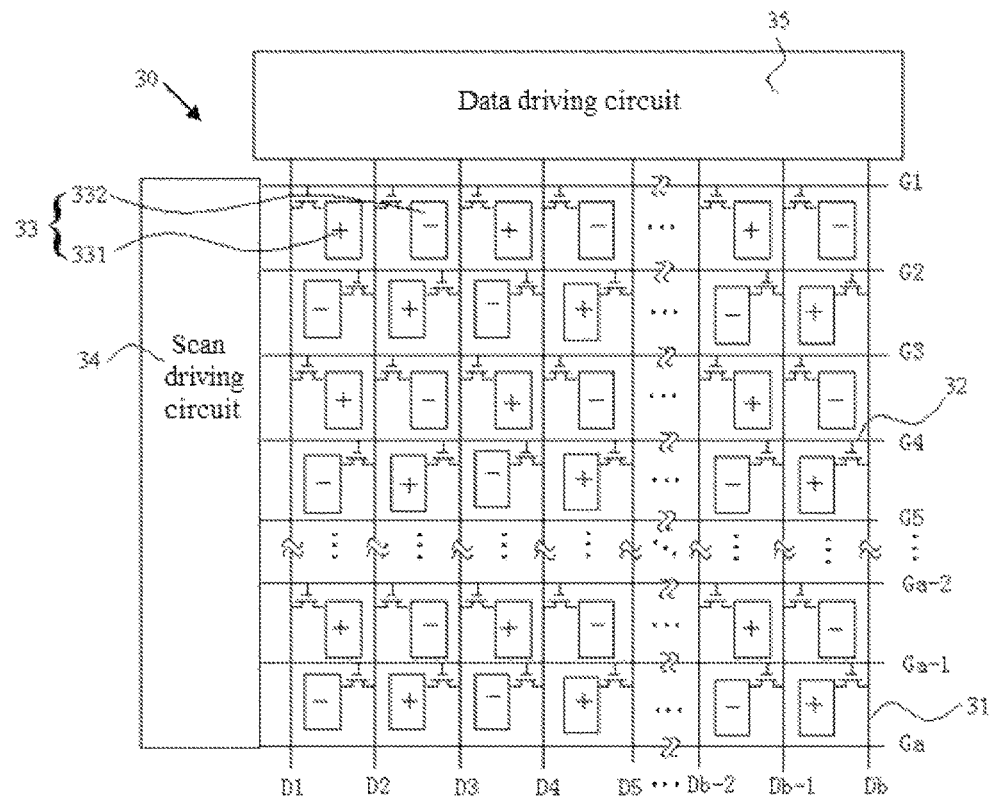
FIG. 3 is a structural schematic diagram of a LCD panel according to a first preferred embodiment of the present invention.

FIG. 3 is a structural schematic diagram of a LCD panel according to according to a first preferred embodiment in the present invention. In the preferred embodiment, the LCD panel 30 includes a plurality of data lines 31 (D1~Db) in parallel with each other, and a plurality of scan lines 32 (G1~Ga) in parallel with each other. The plurality of data lines 31 and scan lines 32 are intersected perpendicularly with each other to form a plurality of pixel units 33. The plurality of pixel units 33 comprise a plurality of first pixel units 331 and a plurality of second pixel units 332, wherein the first pixel units 331 are configured to receive first data signals, and the second pixel units 332 are configured to receive second data signals. The amount of the first pixel units 331 is equal to the amount of the second pixel units 332. When the LCD panel 30 displays odd frames, a polarity of each of the first pixel units 331 is changed (which means that it changes the polarity of the first data signal) and a polarity of each of the second pixel units 332 is maintained; when the LCD panel displays even frames, a polarity of each of the second pixel units 332 is changed, and a polarity of each of the first pixel units 331 is maintained. Alternatively, when the LCD panel displays odd frames, a polarity of each of the second pixel units 332 is changed, and a polarity of each of the first pixel units 331 is maintained; when the LCD panel displays even frames, a polarity of each of the first pixel units 331 is changed, and a polarity of each of the second pixel units 332 is maintained.

Figure 4:
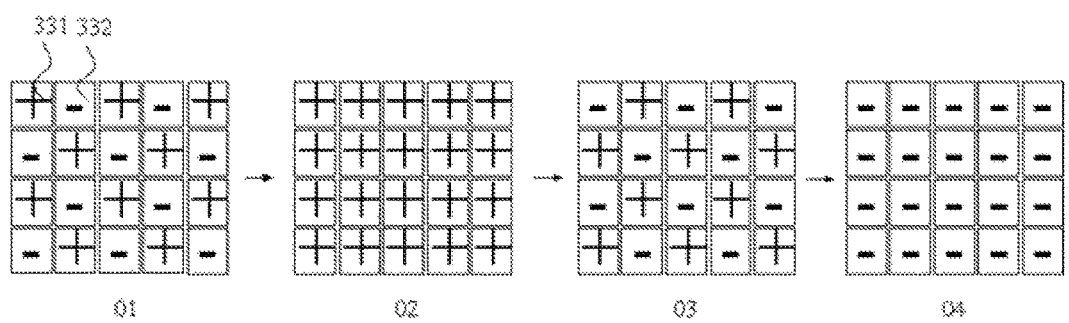
FIG. 4 is a schematic diagram of pixel polarity when the LCD panel of the first preferred embodiment of the present invention is driven to display.

FIG. 3 and FIG. 4 show a detailed description of the working principle of the LCD panel of the preferred embodiment. FIG. 4 is a schematic diagram of pixel polarity when the LCD panel of the first preferred embodiment of the present invention is driven to display.

In FIG. 3, the first pixel units 331 and the second pixel units 332 are interleaved in arrangement thereof, which means that the first pixel units 331 are surrounded by the second pixel units 332, and the second pixel units 332 are also surrounded by the first pixel units 331. This arrangement is the same as the different polarity pixel units of the existing dot inversion driving method. Referring to FIG. 4, when the LCD panel 30 turns on, the frames 01 to 04 are four consecutive frames, where the frames 01 and 03 are configured to display the left-eye frame signals, and the frames 02 and 04 are configured to display the right-eye frame signals.

By taking the upper left side pixel of FIG. 4 for example, when a first left-eye frame 01 is displayed, the upper left side pixel appears in a positive polarity which displays a positive polarity left-eye data signal; when a first right-eye frame 02 is displayed, the pixel also appears in a positive polarity which displays a positive polarity right-eye data signal; when a second left-eye frame 03 is displayed, the pixel appears in a negative polarity which displays a negative polarity left-eye data signal; when a second right-eye frame 04 is displayed, the pixel appears in a negative polarity which displays a negative polarity right-eye data signal. Since the pixel displayed both the positive polarity left-eye and right-eye data signals and the negative polarity left-eye and right-eye data signals in the four consecutive frames, the grayscale value of the left-eye image and the right-eye image is either large or small. The pixel in each of the four consecutive frames will switch the pixel polarity, thus avoiding the generation of image sticking.

The pixel at the upper left side of FIG. 4 is defined as the first pixel units 331 (which means that all of the positive polarity pixels are the first pixels 331), the pixel at the lower left side of FIG. 4 is defined as the second pixel units 332 (which means that all of the negative polarity pixels are the second pixels 332). When a frame 01 is displayed, the first pixel units 331 are positive polarity pixel, and the second pixel units 332 are negative polarity pixel. When a frame 02 is displayed, the first pixel units 331 are positive polarity pixel, and the second pixel units 332 are positive polarity pixel. Otherwise, when a frame 03 is displayed, the first pixel units 331 are negative polarity pixel, and the second pixel units 332 are positive polarity pixel; and when a frame 04 is displayed, the first pixel units 331 are negative polarity pixel, and the second pixel units 332 are negative polarity pixel.

Therefore, when the frame 01 is displayed, the brightness of the second pixel units 332 is greater than that of the first pixel units 331 (the second pixel units 332 in the frames 01 and 04 share the same polarity, therefore causing the second pixel units 332 to have greater brightness after the pixel charges reallocation). When the frame 02 is displayed, the brightness of the first pixel units 331 is greater than that of the second pixel units 332 (the first pixel units 331 of the frames 01 and frame 02 share the same polarity). When the frame 03 is displayed, the brightness of the second pixel units 332 is greater than that of the first pixel unit 331. When the frame 04 is displayed, the brightness of the first pixel units 331 is greater than that of the second pixel units 332. Therefore, half of the pixel units 33 in each image frame have greater brightness, and the other half of the pixel units 33 have lower brightness. The overall brightness of each frame is equal to the time interval, such that the brightness difference between the left-eye image and right-eye image can be prevented, thereby avoiding 3D ghosting.

Each of the pixel units 33 of the LCD panel 30 in the preferred embodiment further comprises a thin film transistor 333 and the pixel electrode 334. The thin film transistor 333 includes a gate, a source, and a drain. The gate is connected to the corresponding scan line 32, the source is connected to the corresponding data line 31, and the drain is connected to the corresponding pixel electrode 334. The thin film transistor 333 is disposed in the pixel unit 33 and close to the location where the scan line 32 and the data line 31 intersect.

The LCD panel 30 of the preferred embodiment further includes a scan driving circuit 34 and a data driving circuit 35. The scan driving circuit 34 is connected to the scan lines 32, and the data driver circuit 35 is connected to the data lines 31. The data driving circuit 35 includes a plurality of signal driving ends. The data driving circuit controls multiple signal driving ends having different voltage polarities according to the output control signal of the timing control circuit (not shown), thereby outputting different polarity data signals when different frame images are displayed.

Each frame of the preferred LCD panel only changes the polarity of the partial pixel units, so that the image sticking and 3D ghosting phenomena of the LCD panel can be effectively eliminated.

Figure 5:
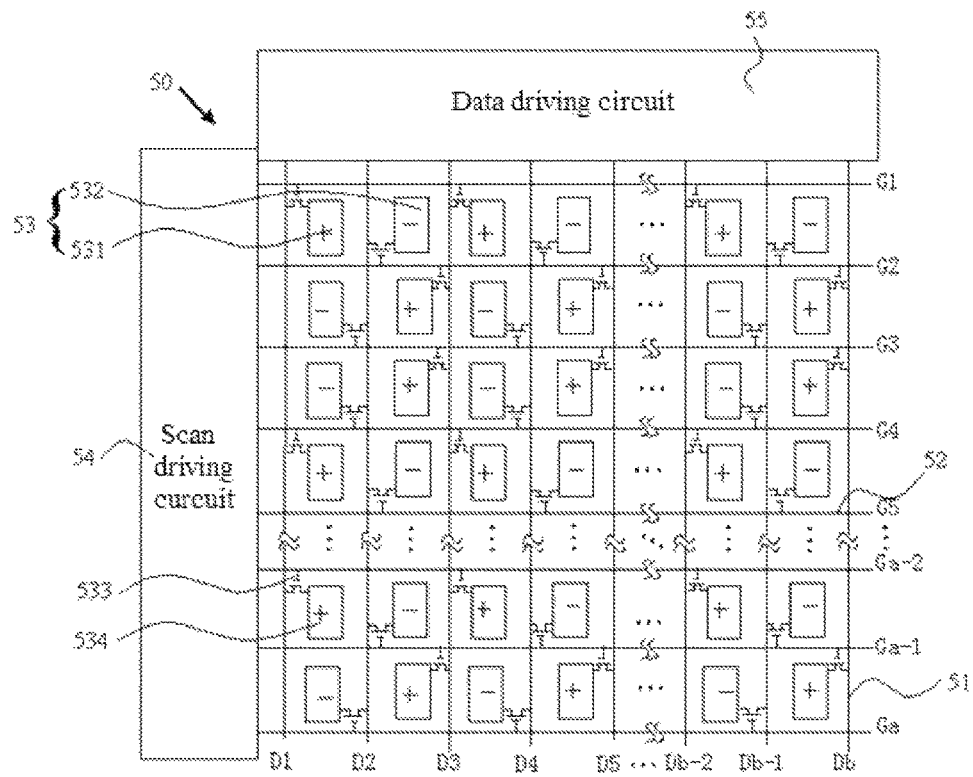
FIG. 5 is a structural schematic diagram of a LCD panel according to according to a second preferred embodiment of the present invention.

FIG. 5 is a structural schematic diagram of a LCD panel according to according to a second preferred embodiment of the present invention. The difference between the second preferred embodiment and the first preferred embodiment is that the first pixel units 531 and the second pixel units 532 are interleaved in another arrangement, but the amount of the first pixel units 531 is still equal to the amount of the second pixel units 532. When the preferred LCD panel 50 displays odd frames, a polarity of each of the first pixel units 531 is changed, and a polarity of each of the second pixel units 532 is maintained; when the LCD panel 50 displays even frames, a polarity of each of the second pixel units 532 is changed, and a polarity of each of the first pixel units 531 is maintained. Or when the LCD panel 50 displays odd frames, a polarity of each of the second pixel units 532 is changed, and polarity of each of the first pixel units 531 is maintained; when the LCD panel displays even frames, a polarity of each of the first pixel units 531 is changed, and a polarity of each of the second pixel units 532 is maintained.

Figure 6:
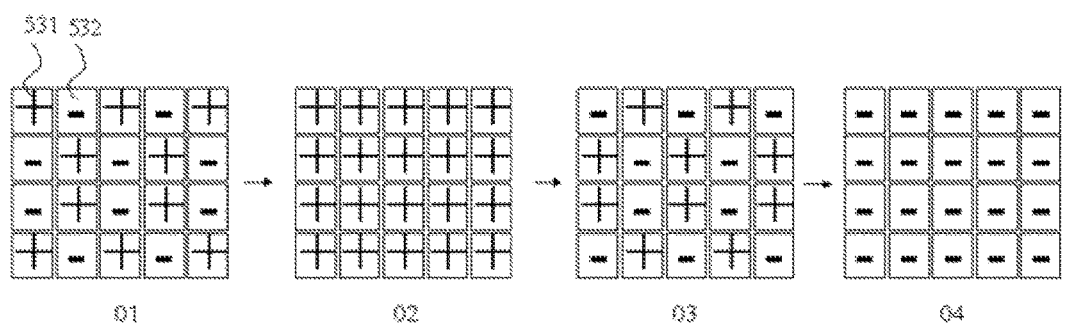
FIG. 6 is a schematic diagram of pixel polarity when the LCD panel of the second preferred embodiment of the present invention is driven to display.

FIG. 5 and FIG. 6 show a detailed description of the working principle of the preferred LCD panel. FIG. 6 is a schematic diagram of pixel polarity when the LCD panel of the preferred second embodiment of the present invention is driven to display.

Referring to FIG. 6, when the LCD panel 50 turns on, the frames 01 to 04 are four consecutive frames, where the frames 01 and 03 are configured to display the left-eye frame signals, the frames 02 and 04 are configured to display the right-eye frame signals.

For example, taking the upper left side pixel of FIG. 6, when a first left-eye frame 01 is displayed, the upper left side pixel appears in a positive polarity which displays a positive polarity left-eye data signal. When a first right-eye frame 02 is displayed, the pixel also appears in a positive polarity which displays a positive polarity right-eye data signal. When a second left-eye frame 03 is displayed, the pixel appears in a negative polarity which displays a negative polarity left-eye data signal. When a second right-eye frame 04 is displayed, the pixel appears in a negative polarity which displays a negative polarity right-eye data signal. Since the pixel displays both the positive polarity left-eye and right-eye data signals and the negative polarity left-eye and right-eye data signals in the four consecutive frames, the grayscale value of the left-eye image and the right-eye image is either large or small. The pixel in each of the four consecutive frames will switch the pixel polarity, thus avoiding the generation of image sticking.

The pixel at the upper left side of FIG. 6 is defined as the first pixel units 531 (which means that all of the positive polarity pixels are the first pixels 531), and the pixel at the lower left side of FIG. 6 is defined as the second pixel units 532 (which means that all of the negative polarity pixels are the second pixels 532). When a frame 01 is displayed, the first pixel units 531 are positive polarity pixels, and the second pixel units 532 are negative polarity pixels. When a frame 02 is displayed, the first pixel units 531 are positive polarity pixel, and the second pixel units 532 are negative polarity pixel. Otherwise, when a frame 03 is displayed, the first pixel units 531 are negative polarity pixel, and the second pixel units 532 are positive polarity pixel; when a frame 04 is displayed, the first pixel units 531 are negative polarity pixel, and the second pixel units 532 are negative polarity pixel.

Therefore, when the frame 01 is displayed, the brightness of the second pixel units 532 is greater than that of the first pixel units 531. When the frame 02 is displayed, the brightness of the first pixel units 531 is greater than that of the second pixel units 532. When the frame 03 is displayed, the brightness of the second pixel units 532 is greater than that of the first pixel units 531. When the frame 04 is displayed, the brightness of the first pixel units 531 is greater that of than the second pixel units 532. Therefore, half of the pixel units 53 in each image frame have greater brightness, and the other half of the pixel units 33 have lower brightness.

The overall brightness of each frame is equal to the time interval so that the brightness difference between the left-eye image and right-eye image can be prevented, therefore avoiding 3D ghosting.

Each of the pixel units 53 of the LCD panel 50 in the preferred embodiment further comprises a thin film transistor 533 and the pixel electrode 534. The thin film transistor 533 includes a gate, a source, and a drain. The gate is connected to the corresponding scan line 52, the source is connected to the corresponding data line 51, and the drain is connected to the corresponding pixel electrode 534. The thin film transistor 533 is disposed in the pixel unit 53 close to the location where the scan line 32 and the data line 31 intersect.

The LCD panel 50 of the preferred embodiment further comprises a scan driving circuit 54 and a data driving circuit 55. The scan driving circuit 54 is connected to the scan lines 52, and the data driver circuit 55 is connected to the data lines 51. The data driving circuit 55 includes a plurality of signal driving ends, the data driving circuit controls multiple signal driving ends having different voltage polarities according to the output control signal of the timing control circuit (not shown), thereby outputting different polarity data signals when different frame images are displayed.

Each frame of the preferred LCD panel only changes polarity of the partial pixel units, such that the image sticking and 3D ghosting phenomenal of the LCD panel can be effectively eliminated.

The present invention further provides an LCD device comprising a backlight and an above mentioned LCD panel. A specific operation principle of the LCD device is the same as in the description in the above preferred embodiments. For details, refer to the description in the above preferred embodiments.

The LCD panel and LCD device in the prevent invention divided all the pixel units, only partial pixel units change the polarity in each frame, so that each pixel unit in the four consecutive frames will all switch the pixel polarity. Therefore the generation of image sticking can be prevented. Meanwhile, there are parts of the pixel units which have greater brightness in each frame, and other parts of the pixel units which have lower brightness. The overall brightness of each frame is equal to the time interval so that the brightness difference between the left-eye image and right-eye image can be prevented, thereby avoiding 3D ghosting and enhancing the display quality of the LCD.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A liquid crystal display panel comprising a plurality of data lines in parallel with each other and a plurality of scan lines in parallel with each other, the plurality of data lines and scan lines being intersected perpendicularly with each other to form a plurality of pixel units, wherein the plurality of the pixel units comprise:

a plurality of first pixel units, configured to receive first data signals; and a plurality of second pixel units, configured to receive second data signals;

wherein when the LCD panel displays odd frames, a polarity of each of the first pixel units is changed, and a polarity of each of the second pixel units is maintained; when the LCD panel displays even frames, a polarity of each of the second pixel units is changed and a polarity of each of the first pixel units is maintained so that the first pixel units and the second pixel units have the same polarity; when the LCD panel displays even frames, every two horizontally-adjacent ones and every two longitudinally-adjacent ones of the pixel units have the same polarity, and all of the pixel units have the same polarity.

2. The liquid crystal display panel as claimed in claim 1, wherein the amount of the first pixel units is equal to the amount of the second pixel units.

3. The liquid crystal display panel as claimed in claim 1, wherein the first pixel units and the second pixel units are interleaved in arrangement thereof.

4. The liquid crystal display panel as claimed in claim 1, wherein each of the pixel units further comprises a thin film transistor and a pixel electrode, the thin film transistor includes a gate, a source and a drain, the gate is connected to the corresponding scan line, the source is connected to the corresponding data line, and the drain is connected to the corresponding pixel electrode.

5. The liquid crystal display panel as claimed in claim 1, wherein the liquid crystal display panel further comprises a scan driving circuit and a data driving circuit, the scan driving circuit is connected to the scan lines, and the data line driving circuit is connected to the data lines.

6. A liquid crystal display device comprising:
a back light; and
a liquid crystal display panel comprising a plurality of data lines in parallel with each other and a plurality of scan lines in parallel with each other, the plurality of data lines and scan lines being intersected perpendicularly with each other to form a plurality of pixel units, wherein the plurality of the pixel units comprise:
a plurality of first pixel units, configured to receive first data signals; and
a plurality of second pixel units, configured to receive second data signals;
wherein when the LCD panel displays odd frames, a polarity of each of the first pixel units is changed, and a polarity of each of the second pixel units is maintained; when the LCD panel displays even frames, a polarity of each of the second pixel units is changed, and a polarity of each of the first pixel units is maintained so that the first pixel units and the second pixel units have the same polarity; when the LCD panel displays even frames, every two horizontally-adjacent ones and every two longitudinally-adjacent ones of the pixel units have the same polarity, and all of the pixel units have the same polarity.

7. The liquid crystal display panel as claimed in claim 6, wherein the amount of the first pixel units is equal to the amount of the second pixel units.

8. The liquid crystal display panel as claimed in claim 6, wherein the first pixel units and the second pixel units are interleaved in arrangement thereof.

9. The liquid crystal display panel as claimed in claim 6, wherein each of the pixel units further comprises a thin film transistor and a pixel electrode, the thin film transistor includes a gate, a source and a drain, the gate is connected to the corresponding scan line, the source is connected to the corresponding data line, and the drain is connected to the corresponding pixel electrode.

10. The liquid crystal display panel as claimed in claim 6, wherein the liquid crystal display panel further comprises: a scan driving circuit and a data driving circuit, the scan driving circuit is connected to the scan lines, and the data line driving circuit is connected to the data lines.

11. A liquid crystal display panel comprising a plurality of data lines in parallel with each other and a plurality of scan lines in parallel with each other, the plurality of data lines and scan lines being intersected perpendicularly with each other to form a plurality of pixel units, wherein the plurality of the pixel units further comprise:
a plurality of first pixel units, configured to receive first data signals; and
a plurality of second pixel units, configured to receive second data signals;
wherein when the LCD panel displays odd frames, a polarity of each of the second pixel units is changed, and a polarity of each of the first pixel units is maintained; when the LCD panel displays even frames, a polarity of each of the first pixel units is changed, and a polarity of each of the second pixel units is maintained so that the first pixel units and the second pixel units have the same polarity; when the LCD panel displays even frames, every two horizontally-adjacent ones and every two longitudinally-adjacent ones of the pixel units have the same polarity, and all of the pixel units have the same polarity.

12. The liquid crystal display panel as claimed in claim 11, wherein the amount of the first pixel units is equal to the amount of the second pixel units.

13. The liquid crystal display panel as claimed in claim 11, wherein the first pixel units and the second pixel units are interleaved in arrangement thereof.

14. The liquid crystal display panel as claimed in claim 11, wherein each of the pixel units further comprises a thin film transistor and a pixel electrode, the thin film transistor includes a gate, a source, and a drain, the gate is connected to the corresponding scan line, the source is connected to the corresponding data line, and the drain is connected to the corresponding pixel electrode.

15. The liquid crystal display panel as claimed in claim 11, wherein the liquid crystal display panel further comprises a scan driving circuit and a data driving circuit, the scan driving circuit is connected to the scan lines, and the data line driving circuit is connected to the data lines.

* * * * *